Figure 1:
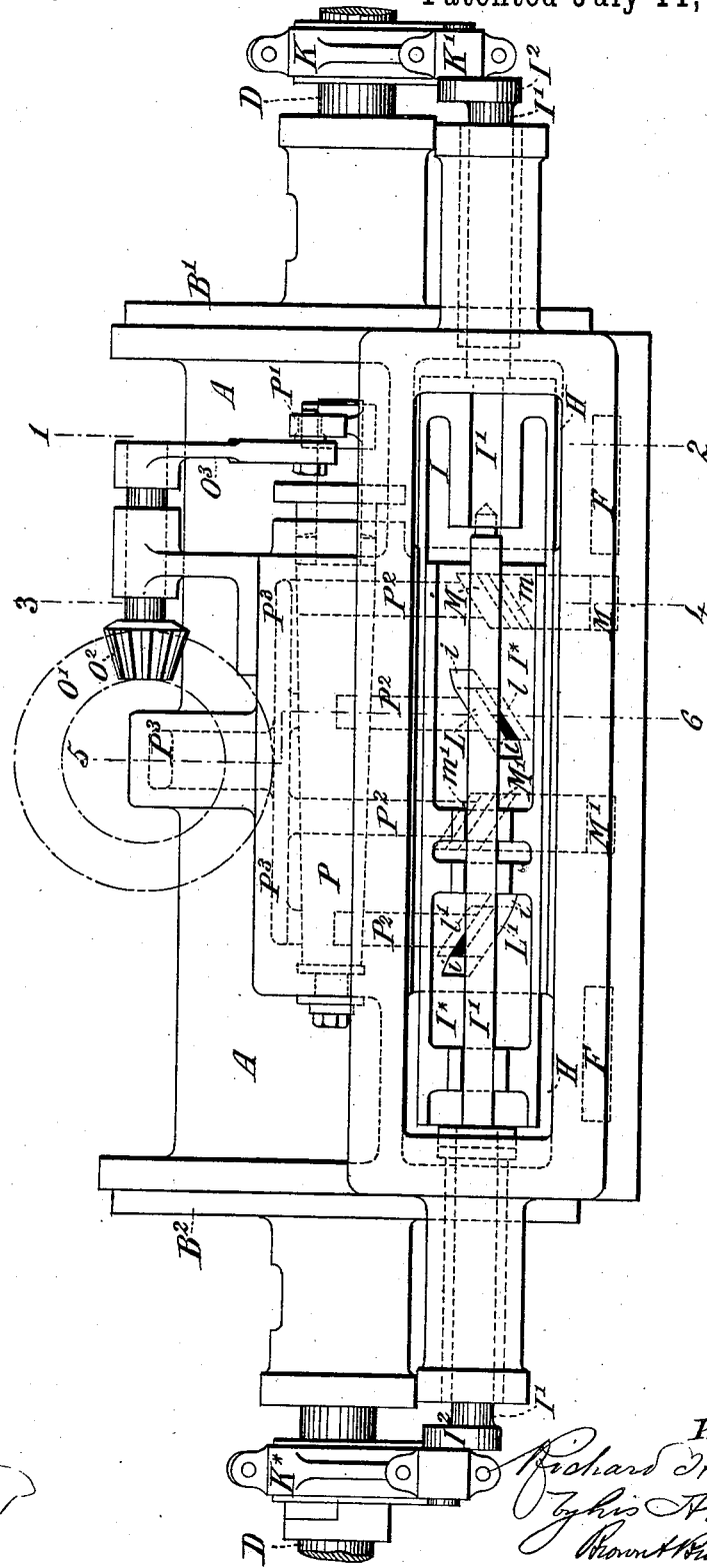

(No Model.)  R. HODSON.  7 Sheets—Sheet 1.
ROTARY ENGINE.

No. 260,978.  Patented July 11, 1882.

Witnesses:  Inventor:

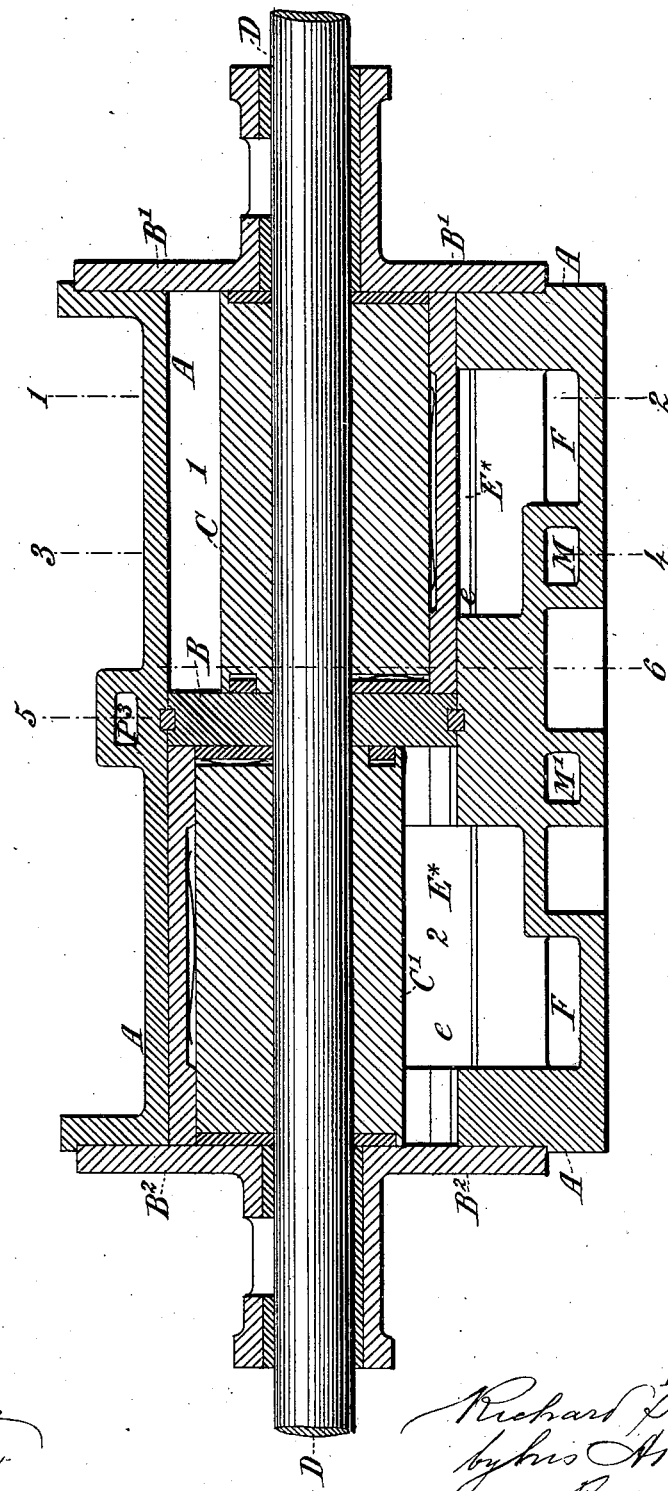

(No Model.)  7 Sheets—Sheet 3.

R. HODSON.
ROTARY ENGINE.

No. 260,978.  Patented July 11, 1882.

Witnesses:
Geo. Haynes
Ed. Moran

Inventor:
R. Hodson
by his Attorneys
Brown & Brown (No Model.) 7 Sheets—Sheet 4.

R. HODSON.
ROTARY ENGINE.

No. 260,978. Patented July 11, 1882.

Witnesses:
L. Hayner
Ed. Moran

Inventor:
R. Hodson
by his Attorneys
Brown & Brown (No Model.) 7 Sheets—Sheet 5.
R. HODSON.
ROTARY ENGINE.
No. 260,978. Patented July 11, 1882.
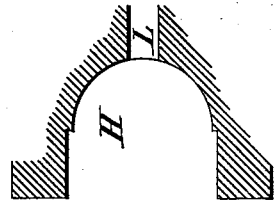
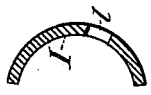
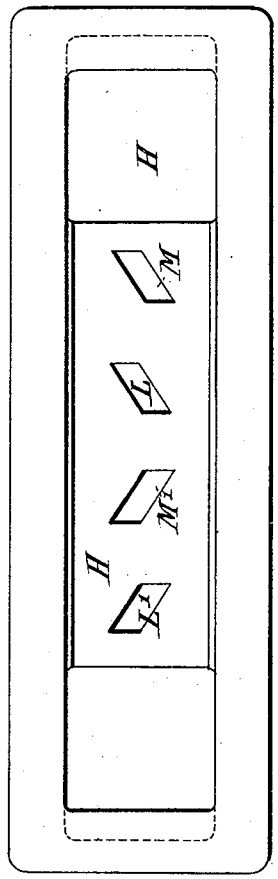
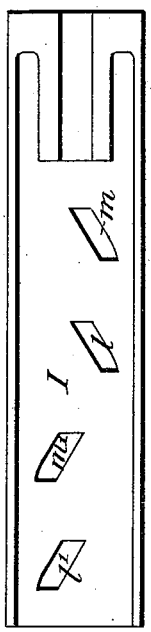
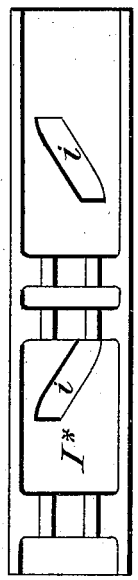
Witnesses: Inventor (No Model.)

R. HODSON.
ROTARY ENGINE.

No. 260,978.

7 Sheets—Sheet 6.

Patented July 11, 1882.

(No Model.)   R. HODSON.   7 Sheets—Sheet 7.

ROTARY ENGINE.

No. 260,978.   Patented July 11, 1882.

Witnesses:
Fred Haynes
Ed. Moran

Inventor:
Richard Hodson
by his Attorneys
Brown & Brown

UNITED STATES PATENT OFFICE.

RICHARD HODSON, OF ABBEY ROAD, ST. JOHN'S WOOD, COUNTY OF MIDDLESEX, ENGLAND.

ROTARY ENGINE.

SPECIFICATION forming part of Letters Patent No. 260,978, dated July 11, 1882.

Application filed April 21, 1882. (No model.) Patented in England September 9, 1881, No 3,920.

*To all whom it may concern:*

Be it known that I, RICHARD HODSON, of Abbey Road, St. John's Wood, in the county of Middlesex, England, civil engineer, have invented certain Improvements in Rotary Engines, of which the following is a specification.

The object of this invention is to produce a reversible rotary engine especially suitable for use in steamships, where reversal of the direction of rotation is frequently required for backing and maneuvering the vessel, and which is also well adapted for locomotives.

In carrying out this object I adopt the construction of engine patented by me in England August 24, 1877, No. 3,224, having the cylinder divided up into two compartments by a transverse partition-wall, and fitted in each compartment with a rotating piston, such pistons being secured to one common shaft and working against a hinged abutment-valve. In this engine an oscillating valve is provided for closing the steam-supply ports, and thereby regulating the supply of steam to the cylinder. I now propose to make this valve control additional steam-ports by giving it an endwise motion, so as to admit steam by the additional ports to the front of the pistons and thereby reverse their direction of rotation. For this purpose I provide also additional abutment-valves acting in an opposite direction to the original valves, such additional valves coming into action when the others are thrown out of action.

I also propose, by the use of a second oscillating valve acting in conjunction with the reversing-valve, to cut off the steam at any desired point of the stroke, and thus, besides converting the rotary engine into a reversing-engine, to make the reversing-engine work expansively.

In Sheets I, II, III, and IV of the accompanying drawings I have shown in several views my improved reversing and expansion rotary engine. In Sheets V and VI, I have illustrated detached parts, which will presently be more particularly referred to, and in Sheet VII, I have given illustrations of the working of the valves.

Figure 4:
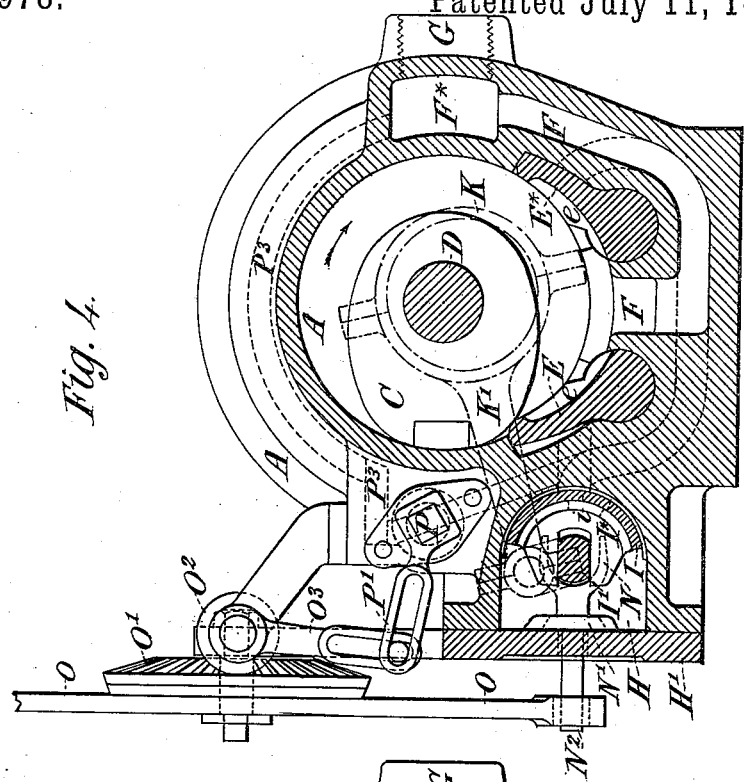
Figure 3:
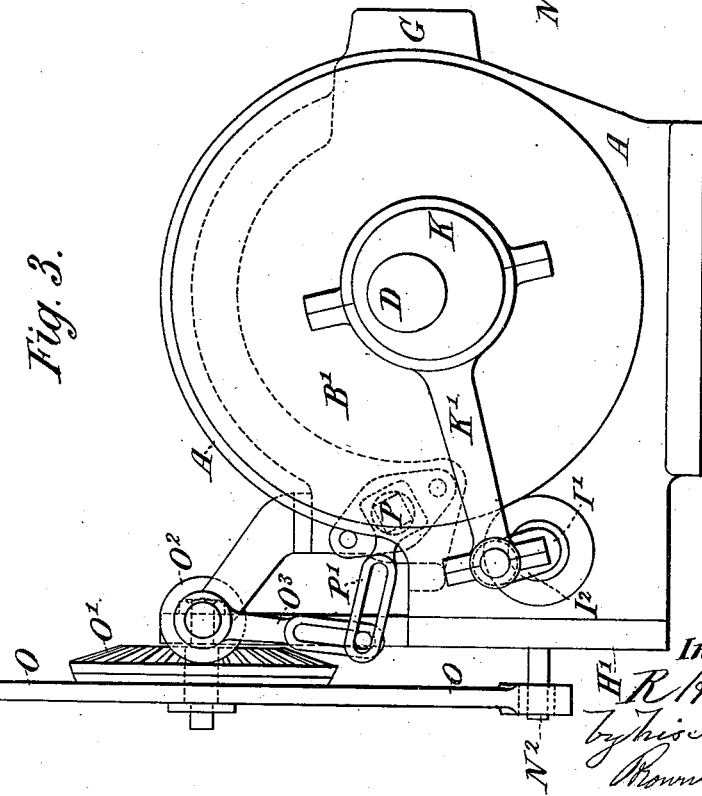
Figure 6:
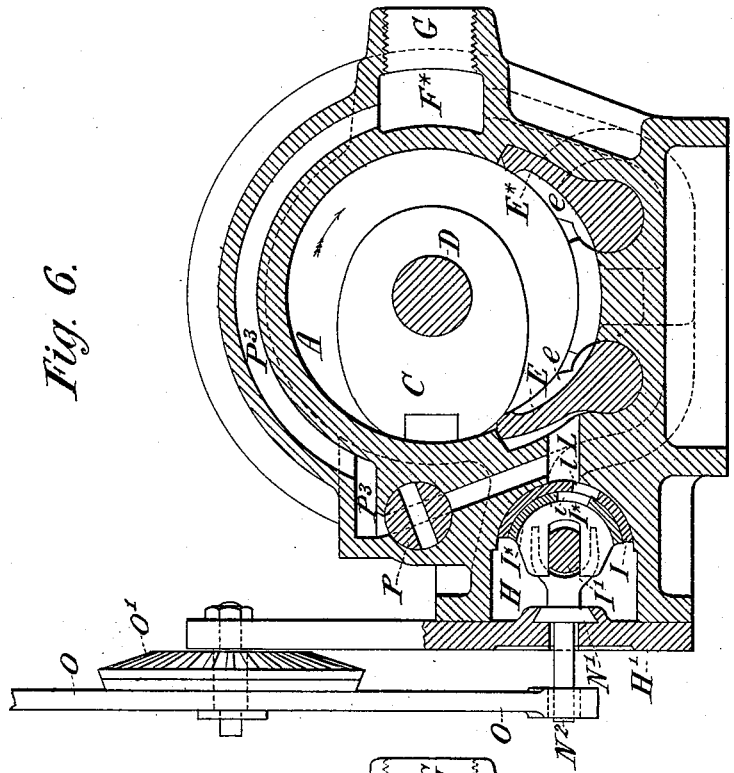
Figure 5:
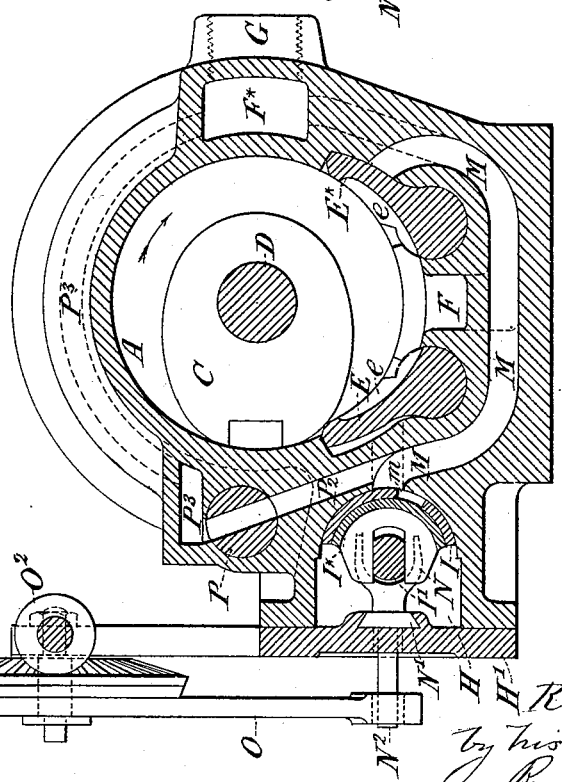
Figure 10:
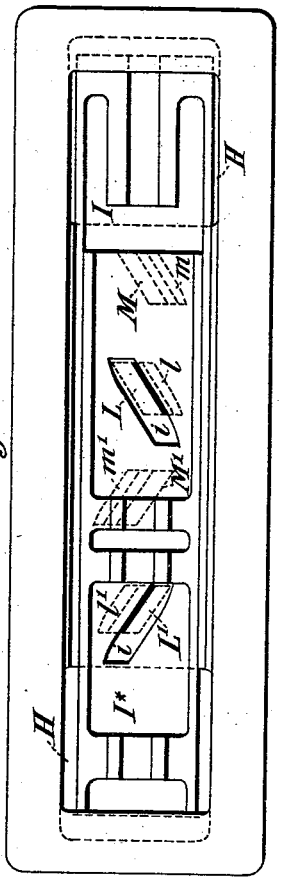
Figure 11:
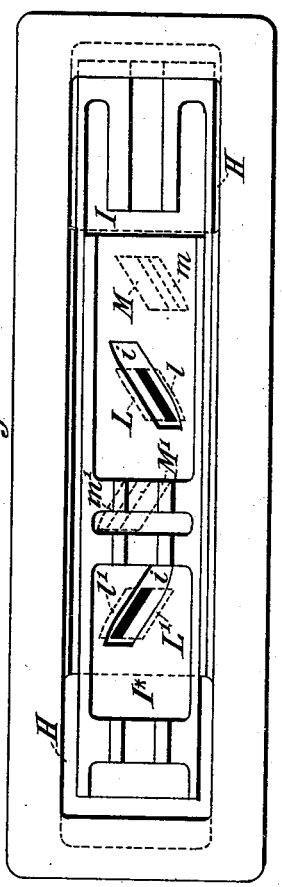
Figure 12:
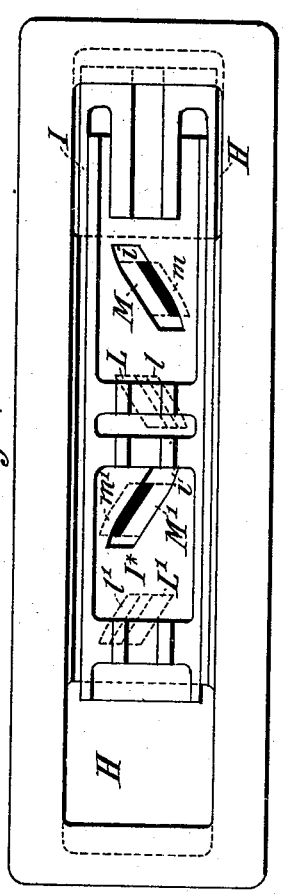
Figure 17:
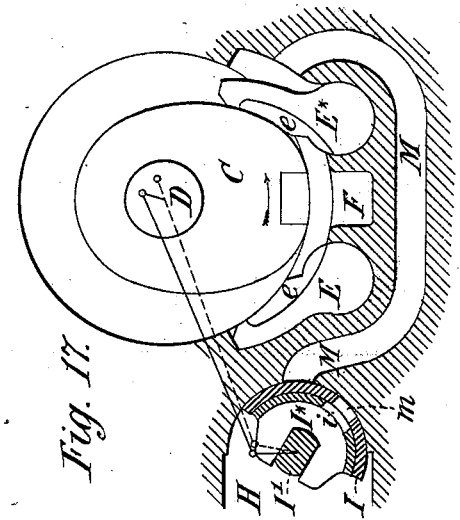

Figure 1 is a side elevation of the engine, the cover of the steam-chest being removed to show the steam-valves therein. Fig. 2 is a longitudinal central vertical section of the engine. Fig. 3 is an end elevation of the engine. Fig. 4 is a transverse section of the engine, taken in the line 1 2 of Figs. 1 and 2. Fig. 5 is a transverse section taken in the line 3 4 of the same figures, and Fig. 6 is a transverse section taken in the line 5 6 of the same figures. Fig. 7 is a face view of the steam-chest, representing four ports which lead two to one compartment and two to another compartment of the cylinder. Fig. 7$^a$ is a cross-section of the steam-chest, taken through one of the ports. Fig. 8 is a face view of the expansion-valve, and Fig. 8$^a$ is a cross-section of the same. Fig. 9 is a face view of the reversing-valve, and Fig. 9$^a$ is a cross-section of the same. Figs. 10, 11, and 12 show the expansion and reversing valves in the valve-chest, and illustrate the positions they take in regulating the expansion of the steam and in reversing the direction of rotation of the engine. Figs. 13 to 16, inclusive, are diagrams showing the action of the engine, the changes of position of the piston corresponding with the changes of position of the valves; and Fig. 17 illustrates the shifting of the sliding valve to reverse the direction of rotation of the engine.

A is the steam-cylinder, divided into two chambers or compartments, 1 2, by a partition-wall, B.

C C' are two cam-pistons, feather-keyed on the shaft D, one on each side of the wall or partition B.

B' B$^2$ are covers which form the ends of the chambers, and in which the shaft D rotates in phosphor-bronze bearings.

The ends of the pistons C and C' work steam-tight against the covers and the partition-wall, their tightness being maintained by suitable metallic surfaces kept in contact by the steam-pressure, and similar provision is made for maintaining steam-tight contact between the pistons and the inner periphery of the cylinder.

In recesses slotted in the respective chambers 1 2 lie the hinged abutment-valves E and E*, one pair in each chamber, which are recessed on their face for the purpose to be hereinafter explained, and are packed at their ends, like the pistons, to make them steam-tight.

When the valves E are open to the pressure of the steam, which occurs while the engine is rotating in the direction of the arrow, the valves E* are closed, there being no steam admitted to them; but when it is desired to reverse the engine the steam is cut off from the valve E and admitted to the valves E*, which, being thereby opened, will cause a reversal of the direction of rotation of the engine.

The valves E E*, it will be seen, are placed near together and back to back, and between these valves is situated the eduction or exhaust port F, which leads to the exhaust-pipe G.

The eduction-passages from the two compartments 1 and 2 meet in a cross-passage, F*, in communication with which is the pipe G.

H is the steam-chest, in which is bored perfectly true a semicircular seating. This valve-chest is fitted with two separate oscillating valves, I and I*, working one over the other. These two valves are carried by a divided spindle, I', to the two parts of which independent rocking motions are given from a pair of excentrics, K K*, on the piston-shaft D. The valve I is made fast to its spindle, and the valve I*, while rocked by its spindle, is free to slide endwise thereon. This divided spindle receives a rocking motion through arms I², keyed to its opposite ends, which arms are each connected to the rod K' of an eccentric-strap surrounding an eccentric, K or K*, on the shaft D.

The oscillating valve I serves to control two pairs of inclined steam-inlet passages, L L' and M M', (see Fig. 7,) which alternately supply steam to the cylinder A, the passages L L' being open to the valve-chest H when the direction of rotation required is that of the arrow, and the passages M M' being open to the valve-chest H when the reverse direction of rotation is required.

In the valve I (shown detached at Figs. 8 and 8ª) are cut four ports, $l$ $l'$ $m$ $m'$, inclining two to the right and two to the left, corresponding to those on the valve-seating; but these ports, it will be seen, are not all in line, and thus contrast with the ports in the valve-seating, which ports all range in a line.

In the reversing-valve I*, (shown detached at Figs. 9 and 9ª,) which is also capable of acting as a stop-valve, are cut two elongated ports, $i$ $i$, inclining toward each other at an angle corresponding to the angle of the ports in the valve I.

Into a recess in the back of the oscillating valve I* projects a clip, N, carried by a slide, N', which moves in guides formed in the cover H' of the steam-chest. From this slide, outside the steam-chest, projects a pin, N², to which is connected the slotted end of a hand-lever, O, pivoted to a bracket standing up from the cover of the steam-chest.

Keyed to the pivot-pin of the rock-lever O is a bevel-wheel, O', into which gears a bevel-pinion, O², for the purpose of transmitting an axial motion to a four-way plug-cock, P, which cock serves, when it is desired to reverse the direction of motion of the engine, to put either the steam-passages L L' or M M' into communication with the exhaust-passage F. The pinion O² is keyed on a short shaft which carries a slotted arm, O³, furnished with an adjustable pin. The pin of this arm enters a slot in an arm, P', fixed to the plug-cock P. When, therefore, the hand-lever O is moved to traverse the valve I*, through the slide and clip before mentioned, for the reversal of the engine the cock P will be simultaneously turned to bring the now closed ports into communication with the exhaust-passages F, and thereby to relieve the closed abutment-valves E or E*, as the case may be, of the back-pressure of steam.

On referring to Fig. 7 the disposition of the four ports L L' and M M' of the steam-chest will be clearly seen. The ports L L' enter directly one into each chamber, behind their respective abutment-valves E, and the two ports M M', after extending around nearly one-third of the cylinder, open one into each chamber, behind their respective abutment-valves E*. The two ports $i$ $i$ in the oscillating valve I* are set so as to correspond with either the ports L L' or the ports M M'. By sliding, therefore, this valve endwise on its rod I' it will admit steam to the cylinder, either through L L' or M M', as desired; or if shifted to a central position it will admit no steam through either set of ports. These ports connect by the passages P² with the seat of the plug-cock P, and by means of passages P³ this seat is brought into connection with the exhaust-passage F*.

I have said that the valve I has simply a rocking motion, but that the valve I* has both a rocking and a longitudinal motion. The different positions of this latter valve determine whether the steam shall enter the ports M M' or L L' and afford a means of stopping the engine, or of working the engine either ahead or astern with any grade of expansion.

The action of the engine is as follows: When going ahead, as indicated by the arrow, steam is admitted to the passages L L', and so soon as the largest radius of the piston of each compartment has passed over the abutment-valve E steam will enter the chamber and drive round the piston, but at any desired point before the piston opens to the exhaust the steam will be cut off by the valve I, actuated by the eccentric K, as already explained. The recess $e$ cast in the abutment-valves provides an escape for the steam, (when the piston is at, say, $y$,) which, passing the piston, escapes by the port F, and thence through the pipe G. The pressure of the entering steam on the back of the abutment-valve E keeps it tight up to the piston, while the valve E* lies back in the recess, as shown, and for the time being forms part of the cylinder. To reverse the engine the oscillating valve I* is slid along by means of the hand-lever O from the position shown in Fig. 1 to the position shown in Fig. 12, so that the steam is admitted through the ports M M', the ports L L' being now closed. The abutment-valves E* now come into action, the steam-pressure keeping them tightly up to their pistons, while the valves E, being relieved from pressure, fall back into their recesses and form part of the cylinder. At the moment of reversing the engine a communication is opened between the ports L L' and the exhaust-ports F, as already explained, for the purpose of relieving the abutment-valves E from back-pressure.

Where pistons of large diameter are required I prefer to use stops to prevent the abutment-valves from coming quite down onto the smallest diameter of the piston. Thus friction will be reduced by taking off the rubbing pressure of the abutment-valve from the piston during a great part of its rotation. In this case a suitable adjustable packing in the abutment-valve must be provided to fill up the space between the face of the abutment-valve and the piston.

Figure 15:
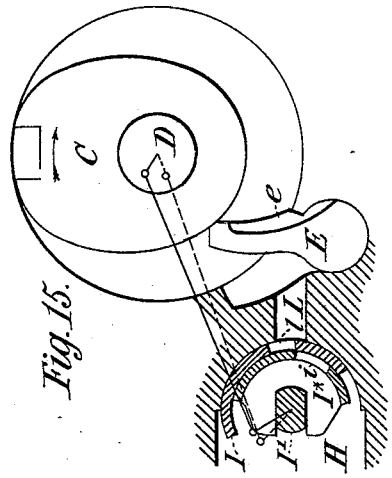
Figure 14:
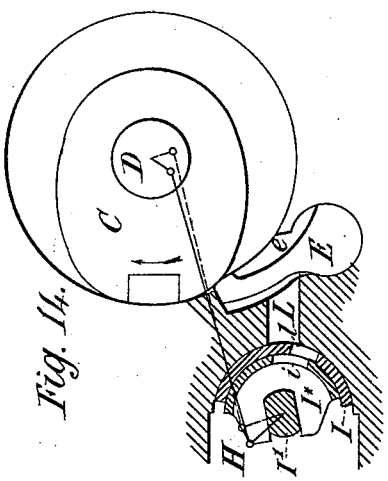
Figure 13:
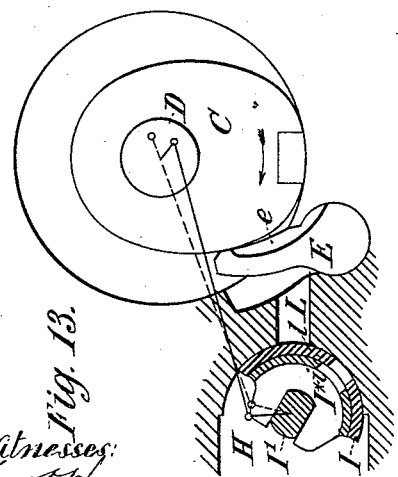
Figure 16:
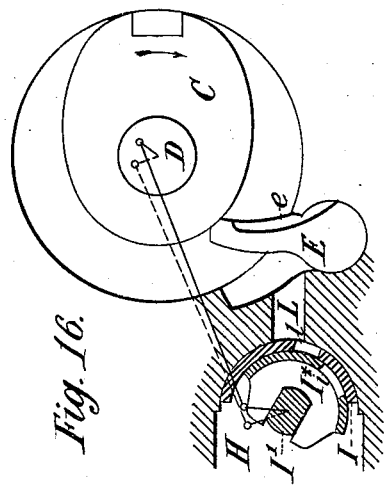

The functions of the valves I and I* will be clearly understood by reference to the figures in Sheet VII. Fig. 13 shows the piston at its dead-point and the steam cut off from the cylinder by the action of both valves I and I*. Fig. 14 shows the piston to have rotated one-quarter, and the valve I as admitting steam to the cylinder, the advance of the valve I* having been accelerated to gain the position for acting expansively. Fig. 15 shows the piston to have completed one-half a rotation, and the valve I* to have just closed the port in the valve I, thereby leaving the steam in the cylinder to act expansively. Fig. 16 shows the piston to have completed three-quarters of a rotation, and the valve I to be closing the steam-inlet to the cylinder, the valve I* having followed up the movements of the valve I to prevent the passage of steam from the steam-chest. Fig. 17 shows the valve I* as set in a position to reverse the direction of rotation of the engine. This is more clearly illustrated in the face view, Fig. 12. The relative endwise positions of the valves, when the valve I* is adjusted for different degrees of expansion, are similarly illustrated in the face views, Figs. 10 and 11.

I would remark that, as it is necessary to give the eccentric of the valve I* a start in advance of the eccentric K, in whichever direction the engine is working, the eccentric K* is mounted loosely on the shaft, and is worked by means of a recessed driver keyed upon the shaft, and receiving in its recess a stud projecting from the side of the eccentric, as shown at Fig. 1.

Having now set forth the nature of my invention and explained the manner of carrying the same into effect, I wish it to be understood that I claim—

1. In combination with the cylinder of a rotary engine, divided up into compartments, a pair of abutment-valves to act upon the divided rotary piston, a double set of induction-passages controlled by an oscillating valve capable of receiving an endwise motion on its seat, and a plug-cock actuated by the reversing-gear, which brings the induction-passages alternately into communication with the exhaust-passage when the direction of rotation is required to be reversed, substantially as herein described.

2. In a rotary engine, the combination, with a reversing-valve which has an oscillating and is capable of receiving an endwise motion, of a second oscillating valve forming the seat for the reversing-valve and controlling the steam-ports for the purpose of cutting off the steam at any required part of the stroke, as described.

R. HODSON.

Witnesses:
 H. K. WHITE,
 GEO. H. CANTLE.